Aug. 20, 1940.  J. R. NEILL ET AL  2,212,123
CASE FOR OPERA GLASSES AND THE LIKE
Filed Dec. 30, 1938
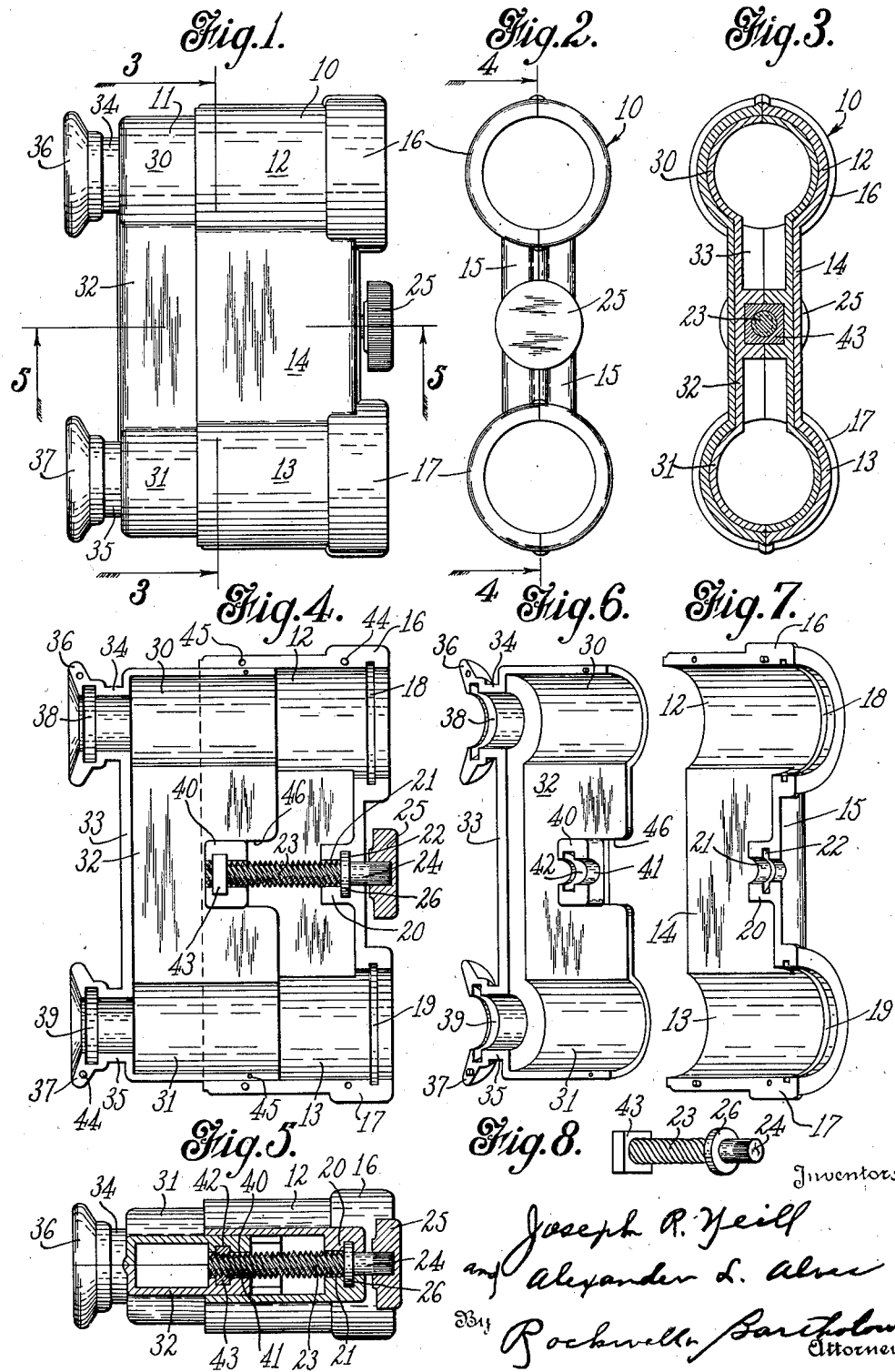

Patented Aug. 20, 1940

2,212,123

UNITED STATES PATENT OFFICE 2,212,123

CASE FOR OPERA GLASSES AND THE LIKE

Joseph R. Neill and Alexander L. Alves, Watertown, Conn., assignors to The Watertown Manufacturing Company, Watertown, Conn., a corporation of Connecticut Application December 30, 1938, Serial No. 248,445

2 Claims. (Cl. 88—34)

This invention relates to cases for opera glasses and the like, and more particularly to a case of this character designed to be made of a moldable plastic material such that it will have a pleasing appearance, and at the same time may be economically constructed and possess the characteristics desirable for this type of article. It is necessary, as is well known, to provide an adjustment between the eye-piece and the objective lens of opera glasses, field glasses or similar articles, so that they may be regulated for distance, and to suit the eyes of the individual user.

The present invention, therefore, relates to an opera glass case of a moldable plastic material, made in two parts, a front outer portion which carries the objective lenses, and a rear inner portion which carries the eye-pieces, the latter being telescopically received within the former for purposes of adjustment by a manually manipulated screw. Moreover, each of these portions is made in two substantially similar halves, which may be readily molded, and thereafter secured together when the device is assembled by a suitable cementing operation.

One object of the present invention is the provision of an opera glass case made in two parts, of a moldable plastic material, one of which parts is slidably or telescopically received within the other for purposes of adjustment.

A still further object of the invention is the provision of a case for opera glasses or the like which may be readily and conveniently made in sections, of a moldable plastic material, which sections are during their manufacture provided with means for receiving the adjusting devices, so that the parts of the case when assembled together may be adjusted in telescopic relation to each other.

To these and other ends the invention consists in the novel features and combinations of parts to be hereinafter described and claimed.

In the drawing:

Fig. 1 is a top plan view of a case for opera glasses or field glasses embodying my invention;

Fig. 2 is a front view of the same;

Fig. 3 is a sectional view on line 3—3 of Fig. 1;

Fig. 4 is a sectional view on line 4—4 of Fig. 2;

Fig. 5 is a sectional view on line 5—5 of Fig. 1;

Fig. 6 is a perspective view of one half of the rear portion of the case;

Fig. 7 is a perspective view of one half of the front portion of the case; and

Fig. 8 is a detail perspective view of the adjusting screw.

To illustrate a preferred embodiment of the invention, there is shown in the drawing an opera glass case consisting of a front outer portion 10 and a rear inner portion 11. It will be understood, as the description proceeds, that the rear portion is slidably or telescopically received within the front portion for purposes of adjustment.

The outer portion of the device consists of two substantially similar halves, one of which is shown in Fig. 7. Each of these halves consists of a pair of spaced semi-cylindrical portions 12 and 13 connected by a flat web portion 14. At its front edge there is provided on the web portion an upstanding flange 15 which serves to close at the front the space between the webs or plates 14 of the two halves of this portion of the case.

The semi-cylindrical portions 12 and 13 are provided at their front ends with thickened flanged annular portions 16 and 17 provided with semi-circular grooves 18 and 19 to receive the objective lenses. Also on the web portion 14 adjacent the flange 15 there is molded integrally with this portion of the device a lug 20 having a semi-cylindrical recess 21 in its upper surface, intermediate the ends of which there is an enlarged recess 22.

It will be understood that the front portion 10 of the case consists of two of the parts just described and shown in Fig. 7, these parts being of identical form and placed together to form a pair of cylindrical end portions or lens barrels joined by the spaced webs or plates 14. The flanges 15 on these two parts cooperate to close the front of the case, and the recesses 21 form a cylindrical opening to receive the adjusting screw 23, the end 24 of which projects forwardly from the case to be provided with the manually manipulable button 25, as shown in Fig. 4. A washer 26 is secured to the screw, and as shown in Fig. 4, when the parts are in assembled position, this washer lies loosely in the recess 22, thus holding the adjusting screw 23 against longitudinal movement.

In like manner the rear portion 11 of the casing is made of two substantially similar halves molded of a plastic material of ornamental character, preferably the same as the material employed in connection with the front portion 10. One of these sections is shown in Fig. 6, and, as will be apparent from reference to this figure, consists, as in the case of a section of the front portion 10, of a pair of spaced semi-cylindrical portions 30 and 31 connected together by the web or plate-like portion 32, this portion having adjacent the rear end a flange 33. Extending rearwardly from the semi-cylindrical portions 30 and 31 are reduced portions 34 and 35, these portions being provided with thickened flanges 36 and 37 at their ends, in which are semi-cylindrical slots 38 and 39 to receive the eye-pieces or ocular lenses of the instrument.

Also, each of the sections shown in Fig. 6 is provided with a lug 40, preferably molded integrally with the web portion 32, this lug being substantially centrally located relatively to the side edges of the web portion and in line with the lug 20 of the front portion of the case. This lug is also provided with a semi-cylindrical opening 41 in which is a transverse recess or socket portion 42, the recess 41 being designed to receive the body of the screw 23, while the recess 42 is designed to receive a nut 43 threaded upon the screw, as clearly shown in Fig. 4.

As has been stated, the rear portion 11 of the device is made of two parts, like that shown in Fig. 6 and described above. These two parts are placed together, in opposing relation, as in the case of the parts of the front portion 10, and as shown in Figs. 3 and 5, the contacting edges being cemented together in a suitable manner. The rear portion 11 of the case which is thus formed will consist of two cylindrical end portions designed to be telescopically received in the similarly shaped end portions of the front part 10 of the case, which end portions are connected by the spaced webs 32, these webs, of course, being received slidingly between the webs 14 of the front portion of the case. The flanges 33 cooperate to close the rear end of the casing, as shown in Fig. 5.

In assembling the device, one of the sections of the front portion 10 is assembled with a nesting section of the portion 11, as shown in Fig. 4, and the adjusting screw placed in position, as shown in that figure, with the nut lying in the recess in the lug 40, and the washer or disk-like member 26 lying in the recess in the lug 20. The other half of the rear section 10 is then placed in position upon its mate, with the oculars disposed in the recesses 38 and 39. Thereafter the other section of the front portion 10 is placed in its proper position relatively to the mating half of this portion, and when the parts are cemented together the assembly is complete.

To facilitate assembly of the device, the mating surfaces of the half portions or sections may be provided with interengaging bosses or pins 44 and openings 45, the pins and openings being oppositely disposed so that the opening in one of the sections will receive the pin of the mating section, and facilitate the assembly of the parts in correct position.

The parts may be secured together by any proper cement or similar material. If the plastic composition of which the case is made is a cellulose acetate material, which has been found to be a highly satisfactory plastic for this purpose, the edges can be cemented together by acetone, which will cause them to adhere and be joined together into a substantially integral structure, the acetone being a solvent for the cellulose material.

It will be apparent that a case such as described may be readily and economically molded from a plastic ornamental material, such as described, and the sections conveniently assembled and secured together to form a case which will be exceedingly attractive in appearance and durable in construction. The finished case will be entirely closed at the front and rear ends by the cooperating flanges 15 and 33, and at the same time the rear edge of the front portion 10 of the casing is left open to slidably receive the front end of the rear portion 11. In each case the two portions of the casing consist of the cylindrical end members joined by spaced webs, the webs carrying between them the lugs 20 and 40 to receive the adjustable screw and nut. Referring to Fig. 6, it will be seen that the front portion of the web 32 is provided with an opening 46 at its front edge to receive the lug 20 on the web, so that the parts may fit closely together. After the nut 43 has been threaded upon the screw 23, the latter may be slightly upset at its free end, or the threads deformed at said end, so that the nut will not become completely detached from the screw during adjusting operations.

While we have shown and described a preferred embodiment of our invention, it will be understood that it is not to be limited to all of the details shown, but is capable of modification and variation within the spirit of the invention and within the scope of the appended claims.

What we claim is:

1. An opera glass construction comprising a case, said case comprising a front outer portion open at its rear end and a rear inner portion slidably received within said outer portion and projecting rearwardly therefrom, each of said portions comprising substantially similar half sections of a moldable plastic material and each section comprising end members of semi-cylindrical shape joined by a web, said sections being assembled in opposing relation and secured together to form end members of cylindrical shape with the webs in spaced relation, and the webs of the sections of the front portion being provided with integrally formed boss members which when said sections are assembled form a boss having a longitudinal opening therethrough and a washer socket within the boss surrounding said opening and intermediate the ends of the opening, an adjusting screw rotatably mounted in said opening, a washer secured to said screw and rotatably mounted in said socket to hold the screw against longitudinal movement, and a nut on said screw, said nut being carried by the webs of the rear portion.

2. An opera glass construction comprising a case, said case comprising a front outer portion open at its rear end and a rear inner portion slidably received within said outer portion and projecting rearwardly therefrom, each of said portions comprising substantially similar half sections of a moldable plastic material and each section comprising end members of semi-cylindrical shape joined by a web, said sections being assembled in opposing relation and secured together to form end members of cylindrical shape with the webs in spaced relation, and the webs of the sections of the front portion being provided with integrally formed boss members which when said sections are assembled form a boss having a longitudinal opening therethrough and a washer socket within the boss surrounding said opening and intermediate the ends of the opening, an adjusting screw rotatably mounted in said opening, a washer secured to said screw and rotatably mounted in said socket to hold the screw against longitudinal movement, and the webs of the sections of the rear portion of the case being provided with integrally formed boss portions which together form a boss having an opening therethrough and a nut socket surrounding said opening, and a nut held against rotation in said socket and receiving the threaded end of said screw.

JOSEPH R. NEILL.
ALEXANDER L. ALVES.